United States Patent Office 3,299,174
Patented Jan. 17, 1967

3,299,174
COMPOSITIONS COMPRISING MONO-OLEFIN POLYMERS AND HYDROGENATED BLOCK COPOLYMERS
Calvin J. Kuhre and Charles A. Dallas, Berkeley, Walter R. Haefele, Orinda, and Marvin A. Deisz, Berkeley, Calif., assignors to Shell Oil Company, New York, N.Y., a corporation of Delaware
No Drawing. Filed Apr. 25, 1963, Ser. No. 275,501
8 Claims. (Cl. 260—876)

This invention relates to polymeric compositions of matter comprising olefin polymers and certain block copolymers. More particularly, the invention comprises polymeric compositions of polymerized alpha olefins with saturated or substantially saturated block copolymers. Mixtures of many types of polymeric materials have been studied in the past. One of the aspects of many plastic materials comprises their shortcomings relative to impact resistance as well as with respect to their tensile strength over a range of temperatures. The impact resistance of alpha olefin polymers has been modified and sometimes improved by the addition thereto of certain natural and synthetic rubbers. While the compositions so prepared exhibit improvements in limited respects relative to impact resistance, this improvement is usually gained at the expense of other properties. One of the principal disadvantages of these conventional rubber blends is easily demonstrated by flexing a bar or sheet of the modified composition. This results in a distinct whitening of the composition at the stressed area which is usually referred to as "blushing." When flexing is relaxed, this blushing usually remains or disappears only in part, thus leaving the article in a visually damaged state and often in a mechanically undesirable condition. The exact reason for this is not certain but is probably due to phase separation or the appearance of micro-cracks in the composition at the point of maximum stress. It is obvious to marketers of such compositions that this constitutes a major limitation upon the compositions insofar as saleability and appearance are concerned.

It is an object of the present invention to improve the properties of certain polymeric compositions. It is a further object of the present invention to improve the tensile strength of the block copolymers described in detail hereinafter as well as to improve the tensile strength of polymerized alpha olefins. It is a particular object of the invention to improve the clarity and impact resistance of alpha olefin polymers and thus to improve their utility while at the same time avoiding the blushing phenomenon referred to above. Further objects include the provision of compositions having either elastomeric or plastic properties, as desired. Other objects will become apparent during the following description of the invention.

Now, according to the present invention, polymeric compositions are provided comprising an alpha olefin polymer having a molecular weight of at least 5000 and preferably in excess of 10,000 and hydrogenated block copolymers having the general configuration

A–B–A wherein the polymeric blocks A comprise (prior to hydrogenation) polymerized vinylcyclo hydrocarbons, said blocks having an average molecular weight between about 4000 and 115,000 and the block B (prior to hydrogenation) comprises a polymerized elastomeric block of conjugated diene hydrocarbons, said elastomeric center blocks having an average molecular weight between about 20,000 and 450,000, the blocks A comprising 2–33% by weight of the copolymer, at least 70% of the double bonds originally present in the copolymer being removed by hydrogenation.

While hydrogenated block copolymers not meeting all of these limitations exhibit certain advantages in combination with olefin polymers this particular class have been found to possess the maximum combination of desirable properties.

Preferably, the present invention comprises polymeric compositions of alpha olefin polymers wherein the alpha olefin has from 2–18 carbon atoms per molecule and the average molecular weight of the polymer is in excess of about 10,000, combined with block copolymers wherein (prior to hydrogenation) the terminal blocks A in the above formulation comprise polymerized vinyl aromatic hydrocarbons and the center block comprises polymerized $C_{4-10}$ conjugated dienes, said block copolymer having been hydrogenated to reduce unsaturation to less than 20% of its original value, the average molecular weight of the center conjugated diene polymer block being between about 50,000 and 300,000. The benefits gained by use of the present compositions will vary with the identity and proportion of the components, including one or more of the following: improvement in tensile strength, substantial improvement in low temperature impact resistance, and reduction or removal of blushing of the composition upon stress.

The alpha olefin polymers to be used in accordance with the present invention are ethylene or higher olefin polymers, and include atactic, syndiotactic or isotactic structures. The beneficial effects are particularly noticeable when using alpha olefin polymers comprising at least about 55% of crystalline structure and particularly when the average molecular weight of the alpha olefin polymer is in excess of about 30,000.

The isotactic structure comprises portions of the molecule of an alpha olefin polymer in which, when the molecule is arbitrarily assumed to be fully extended in a plane, the R substituents (alkyl) on the tertiary carbon atoms of adjacent monomeric units making up the given section of the molecular main chain are all on one side (e.g., above) and the hydrogen atoms bound to said tertiary carbon atoms are all on the other side of the plane of the chain. In a successive syndiotactic portion of the same chain, the position of the alkyl and hydrogen substituents may be reversed with respect to the positions they occupy in the previous portion. Isotactic molecules are linear, regular, head-to-tail molecules having substantially the isotactic structure. Usually, isotactic polymers are homopolymers substantially consisting of isotactic molecules as defined herewith.

The isotactic polymers may be obtained for example by polymerizing an alpha olefin in an inert hydrocarbon solvent with catalysts prepared from compounds of heavy metals of the first sub-group of Groups IV–VI of the Mend Periodic Table and organo metallic compounds of metals of Groups II–III of that Periodic Table. It has also been shown that depending upon the specific catalyst used in the polymerization, the crude polymerizate may be a mixture of isotactic and atactic polymers with a prevelance of the atactic structure which can be separated by means of selective solvents or the crude polymerizate may be prevailingly, e.g., over 50% to substantially all isotactic. Thus, when the catalyst is prepared from a high valency halide of a transition metal such as titanium tetrachloride and triethyl aluminum and is substantially non-crystalline insolubly to finely dispersable in the hydrocarbon solvents, the crude polymerizate is generally substantially amorphous but contains some isotactic polymers which can be separated by means of selective solvents from the crude product. On the other hand, it has been shown also that when the catalyst is prepared from a low valency transition metal halide such as titanium trichloride and triethyl aluminum and is substantially solid, crystalline and hydrocarbon-insoluble, the crude polymerizate consists prevailingly to substantially of isotactic macromolecules which are substantially crystalline under normal conditions. Selective solvent extraction may be employed to concentrate isotactic polymers from the crude polymerizate.

Rubbers such as polyisobutylene have been blended with olefin polymers to improve impact strength. However, these show permanent blushing upon stress and are translucent. Blends of the present composition have been designed to minimize these technical deficiences.

The alpha olefin polymers may not only comprise homopolymers such as polyethylene or polypropylene, but also may be copolymers, preferably of the plastic (non-elastomeric) type such as the non-elastomeric copolymers of ethylene and propylene. These usually are copolymers in which the propylene content is relatively low, e.g., 85–98% ethylene, the remainder being propylene units. Molecular weight of the polymers may range all the way from about 500 to as much as 2 million or higher, but the major emphasis is placed upon polymers having molecular weights in excess of 10,000 and preferably in excess of about 30,000, usually 200,000–500,000. Block copolymers also are contemplated wherein all of the blocks are alpha olefin species. While the entire range of components is contemplated, the most effective combinations comprise 25–97.5 (preferably 10–90) parts by weight of alpha-olefin polymer per hundred parts by weight of composition.

The block copolymers with which the present invention is concerned comprises those having the structure (prior to hydrogenation):

A–B–A wherein the polymer blocks A have average molecular weights from 4000–115,000 and preferably from 8000 to 60,000. The monomers from which the terminal polymeric blocks are formed comprise vinyl cycloaromatic hydrocarbons as well as mixtures thereof. The center block comprises one derived from the polyymerization of conjugated dienes and preferably those having from 4–10 carbon atoms per molecule, the average molecular weight of the center block being between about 20,000 and 450,000, preferably between about 50,000 and 300,000. An essential aspect of these copolymers comprises the low degree of unsaturation thereof provided either by the selection of monomers employed in forming the block polymer or by hydrogenation of the polymer following its formation. Therefore, the unsaturation of the diene polymer block as it is to be used in the subject compositions either inherently possesses or is hydrogenated to create an iodine number between about 0 and 50 and preferably lower than about 25 g.  per 100 g. of polymer and an ultra violet analysis indicating that at least 70% by weight thereof comprises cycloalkane units.

These block polymers are preferably those formed from two types of monomers, the end groups being prepared from vinyl cyclo hydrocarbons, said end polymer blocks having a substantially non-elastomeric character, while the center blocks are characterized by an elastomeric set of properties. Still more preferably, the block copolymers are those in which the end blocks prior to hydrogenation comprise polymer blocks of a vinyl aromatic hydrocarbon connected by a block of a $C_{4-10}$ conjugated diene.

The block copolymers may be characterized by a substantial difference in the glass transition temperature between the end blocks and the center block.

The block copolymers are preferably hydrogenated by the use of catalysts known in the hydrogenation art such as nickel on kieselguhr and the like to reduce the unsaturation of the polymer below the limits specified hereinbefore. Hydrogenation not only provides for improved compatibility with the olefin polymers but also substantially improves the thermal and oxidative resistance of the block copolymers.

The elastometric mid-sections may be produced by the polymerization originally of such conjugated diolefins as butadiene and isoprene as well as methyl isoprene. The non-elastomeric end polymer blocks may comprise homopolymers or copolymers and preferably are prepared from alkenyl aromatic hydrocarbons, particularly vinyl aromatic hydrocarbons wherein the aromatic may be either monocyclic or polycyclic. Typical species include styrene, methylstyrene, vinyl xylene, ethyl vinyl xylene, stilbene, vinyl cyclobutene, vinyl cyclopentene, vinyl naphthalene and the like.

The block copolymers may be prepared by several alternative routes preferably with the use of lithium based catalysts. If a mono hydrocarbon lithium is utilized as the catalyst, the block copolymer formation proceeds by a sequence of steps in which the vinyl cyclic hydrocarbon compound is polymerized with the use of the lithium based catalyst, forming a living polymer terminated with a lithium radical, adding to the polymerization mixture at least one conjugated diene, continuing the polymerization until the desired block length is achieved and thereafter adding a second amount of the same or a different vinyl cyclic hydrocarbon.

The preferred class of catalysts most useful for the preparation of the subject block polymers comprise lithium metal, alkyl lithium compounds and aromatic compounds containing one or more lithium radicals. These include alkyl lithiums such as butyl lithiums, amyl lithiums, hexyl lithiums, and dilithium initiators such as dilithium naphthalene, dilithium stilbene and the like.

When utilizing dilithium initiators, it is possible to first polymerize the conjugated diene to form the center block terminated on each end with a lithium radical and thereafter add the alkenyl cyclo hydrocarbon to form simultaneously the two terminal blocks.

Polymerization is normally conducted at temperatures in the order of −80 to +100° C. with a proportion of catalyst chosen to perform the desired block molecular weight. The precise conditions of polymerization do not form a part of the present invention.

Having obtained the block copolymer, this may be followed by hydrogenation if such is necessary to reduce the unsaturation of the polymer below the maximum figures specified hereinbefore. The products obtained by these and other methods and useful in the compositions of this invention comprise the substantially linear block copolymers wherein the end groups prior to hydrogenation may be represented for example with polymer blocks of styrene and center blocks of polymerized isoprene or of butadiene. After hydrogenation, assuming that substantially complete saturation of the molecule is obtained, the product may be represented, for example, by a saturated polymer wherein the end groups comprise polymerized vinyl cyclohexane while the center elastomeric section comprises ethylene-propylene elastomers.

When hydrogenation is not complete, the final product will be modified from this simplified fully saturated example. For instance, while the end groups would primarily comprise saturated polymers, there may be a certain small proportion of unsaturated radicals remaining. The same would be true of the elastomeric center section.

The proportion of each of the components of the subject polymeric compositions will depend upon the contemplated end use and the desired modification of the physical properties. Since the block copolymers may be tailor-made to have properties ranging all the way from essentially plastic properties to those of elastomeric character, the choice is extremely wide. In the main instances, however, the elastomeric block copolymers are those most desired for use in the present invention and are chiefly those within the molecular weight ranges cited hereinbefore. The lack of blushing in certain ranges of the present compositions is noteworthy, as is the clarity of other blends studied. Moreover, one of the unexpected features of the invention comprises the improvement in tensile strength.

One of the other substantial advantages in the compositions of this invention comprises the fact that these particular types of block copolymers do not require chemical vulcanization to reach their maximum elastomeric properties. Consequently, no chemical vulcanization procedures are required in the operation of this invention nor in the preparation of either of the components.

If compositions having end uses in the thermoplastic range are contemplated, the proportion of modifying block copolymers is normally less than about 40%, preferably 10–30%, especially for the provision of high impact strength coupled with lack of permanent blushing upon stress. On the other hand, if elastomeric compositions are proposed, then the alpha olefin polymer is the minor component and comprises 5–30 parts by weight per 100 parts of composition. Moreover, blends having 40–60% by weight of each type of polymer exhibit substantial advantages for specific uses, especially where high tensile strength is important.

The proportion of each of the components will vary not only with the end use contemplated but also with the identity of each of the components. As data contained in the working examples given hereinafter indicate, each of the pairs of components studied exhibit optimum ranges wherein values such as tensile strength, low temperature impact strength and other properties reach a maximum. Thus, tensile strength at ambient temperatures reaches a maximum at about equal proportions of each of the components. Furthermore, ultimate tensile strength is unexpectedly improved to a value greater than that of either of the individual components tested in the unmodified state. Consequently, it is contemplated to employ as little as 0.5 part and as much as 99.5 parts by weight of either of the components per 100 parts by weight of the polymeric blends.

The blending operation itself may be effected by any suitable means known to experts in the art of handling such materials. Solution blending will provide maximum physical incorporation of each polymer with the other. However, for the most part, physical blending means such as Banbury mixers or roll mills are most suitable, the temperature of milling the essentially solid materials together being chosen to maximize the physical properties of the resulting mixture. This will usually be a temperature in excess of about 170° C. and preferably in excess of about 185° C.

The compositions may be compounded with other components known in the art including synthetic and natural reinforcing fillers such as carbon black, asbestos, fibers, titanium dioxide, other pigments, plasticizers, flow assist agents, and the like. Elastomeric compositions prepared in accordance with the process of this invention are suitable for any purpose where rubbers are employed such as in coatings, mechanical goods, latices, paints, thermoformed articles, insulations, etc. Thus, the primary advantages in this instance comprises the improvement in tensile strength and modulus of the rubbery-like compositions without the necessity for chemical vulcanization thereof and also lacks the disadvantageous blushing phenomenon. These include thermoplastic processing operations in which the compositions may be injection molded, blow molded, compression molded, and other molded articles as well as films, sheets, textile coatings and the like as well as the normal rubber end uses such as mechanical goods and other articles of manufacture.

The compositions may be cast from solvents to form films or spun to form fibers or thread. Plastic molding compositions having the usual plastic end uses may be prepared particularly when the proportion of block copolymer is less than about 50 parts by weight per 100 parts of the total composition, by which is meant the composition of alpha olefin polymer and of block copolymers. Therefore, such end uses are contemplated as molded objects, mechanical goods, extruded materials such as pipes, wire coatings, fibers and the like.

The following examples are given to illustrate presently preferred aspects of the present invention. They should be considered as such and not as unduly limiting the invention.

EXAMPLE I

Isotactic polypropylene having an average molecular weight of about 450,000 (intrinsic viscosity of 2.7 dl./g.), was modified with a fully hydrogenated block polymer having the configuration polystyrene-polyisoprene-polystyrene before hydrogenation.

The individual average molecular weight of each of the blocks was 10,000–75,000–10,000. The blends were mixed on a rubber mill at 180° C. Tables IA and IB, which follow, give the data obtained on the samples prepared wherein the proportion of polypropylene to hydrogenated block copolymer was varied over the entire range from 100% of block polymer to 100% of polypropylene.

*Table IA*

BLENDS OF BLOCK COPOLYMER WITH POLYPROPYLENE

[Compression molded slabs, short die D. die cut specimens; all stretched at 0.2 in./min.]

| Blend | A | B | C | D | E | F | G | H | I | J | K |
|---|---|---|---|---|---|---|---|---|---|---|---|
| Block Copolymer, percent w | 100 | 95 | 90 | 85 | 75 | 50 | 25 | 15 | 10 | 5 | 0 |
| Polypropylene, percent w | 0 | 5 | 10 | 15 | 25 | 50 | 75 | 85 | 90 | 95 | 100 |
| Tensile yield point, p.s.i. | | | | 225 | 350 | 1,350 | 2,775 | 3,375 | 3,825 | 4,225 | 4,575 |
| Tensile at break, p.s.i. | 4,000 | 4,225 | 5,175 | 5,350 | 6,275 | 6,575 | 5,750 | 5,775 | 6,000 | 6,475 | 5,600 |
| Modulus at 300% elongation | 250 | 500 | 650 | 625 | 1,000 | 1,825 | 2,625 | 3,000 | 3,250 | 3,450 | 3,650 |
| Modulus at 500% elongation | | | | 1,100 | 1,450 | 2,500 | 3,500 | 3,625 | 3,500 | 3,675 | 3,900 |
| Elongation at break | 750 | 760 | 750 | 720 | 640 | 750 | 750 | 710 | 870 | 1,030 | 850 |
| Set, percent | 20 | 34 | 40 | 60 | 120 | >300 | >500 | >500 | >500 | >600 | >600 |

Table IB

BLENDS OF BLOCK COPOLYMER WITH POLYPROPYLENE

[Injection molded plastic tensile bars; pulled at 0.2 in./min.]

| Blend | L | M | N | O | P | Q | R | S |
|---|---|---|---|---|---|---|---|---|
| Block copolymer, percent w | 0 | 2 | 5 | 10 | 15 | 25 | 50 | 75 |
| Polypropylene, percent w | 100 | 98 | 95 | 90 | 85 | 75 | 50 | 25 |
| Tensile yield point, p.s.i | 4,650 | 4,500 | 4,250 | 3,925 | 3,450 | 2,850 | 1,675 | 750 |
| Elongation at yield, percent | 10 | | | | 15 | 19 | ~30 | ~50 |
| Tensile modulus, p.s.i.×10⁻⁵ | 2.3 | | | | 1.5 | 1.2 | 0.7 | 0.3 |
| Flexural modulus, p.s.i.×10⁻⁵ | 2.4 | 2.9 | 2.2 | 2.1 | 1.7 | 1.4 | 0.7 | 0.25 |
| Notched izod impact strength, ft. lbs./in.: | | | | | | | | |
| At 0° C | 0.43 | 0.33 | 0.36 | 0.50 | 0.94 | >7 | >15 | (¹) |
| At 23° C | 0.96 | 0.82 | 1.11 | 2.6 | | | | |
| Shore D hardness | 73 | 73 | 72 | 71 | 69 | 65 | 52 | 38 |
| Rockwell R hardness | 96 | 99 | 95 | 90 | 79 | 65 | 20 | 10 |
| Permanent whitening after flexure | Slight | None | None | None | None | None | None | None |

¹ No break.

EXAMPLE II

The effect of the average molecular weight of the individual blocks of the block copolymer, compared with the results obtained in Example I above, were determined by replacing the block copolymer of Example I with a second block copolymer of the same monomers wherein the average molecular weight of the individual blocks was 5000–40,000–5000. The same polypropylene (having an intrinsic viscosity of 2.7 dl./g.) was employed for this purpose.

Table II

| Block polymer, percent w | 100 | 85 | 75 | 50 | 15 | 10 | 0 |
|---|---|---|---|---|---|---|---|
| Polypropylene, percent w | 0 | 15 | 25 | 50 | 85 | 90 | 100 |
| Tensile yield point, p.s.i | (¹) | (¹) | 350 | 3,600 | 3,550 | 3,800 | |
| Tensile strength, p.s.i | 1,275 | 1,325 | 1,350 | 3,625 | | | |
| Modulus at 300% elong., percent | 225 | 450 | 875 | | | | |
| Modulus at 500% elong., percent | 350 | 750 | 1,200 | | | | |
| Elongation at break, percent | 1,030 | 850 | 740 | 45 | 60 | 80 | |
| Set, percent | 33 | 80 | 120 | 18 | 22 | 33 | |
| Shore A hardness | 46 | 57 | 82 | 90 | | | |
| Tensile yield point, p.s.i | | | | | | 3,600 | 4,650 |
| Flexural modulus, p.s.i.×10⁻⁵ | | | | | | 1.6 | 2.4 |
| Notched Izod impact strength, ft. lbs./inch: | | | | | | | |
| 0° C | | | | | | 0.41 | 0.43 |
| 23° C | | | | | | 1.36 | 0.96 |
| Shore D hardness | | | | | | 69 | 73 |
| Rockwell R hardness | | | | | | 84 | 96 |

¹ No yield.

EXAMPLE III

A third block copolymer was utilized together with the same polypropylene, blends being prepared as described in Example I, Table IIIA reports the data obtained with this third polymer, which was made from the same monomers but had individual average block molecular weights of 10,000–50,000–10,000.

Table IIIB presents similar data obtained when using a block copolymer having the same block arrangement wherein the molecular weights of the blocks were 15,000–100,000–15,000; and in Table IIIC, the block molecular weights were 20,000–100,000–20,000.

Table IIIA

| Block polymer, percent w | 100 | 85 | 75 | 50 | 15 | 10 | 0 |
|---|---|---|---|---|---|---|---|
| Polypropylene, percent w | 0 | 15 | 25 | 50 | 85 | 90 | 100 |
| Tensile yield point, p.s.i | (¹) | (¹) | 556 | 1,675 | 3,775 | 3,775 | |
| Tensile strength, p.s.i | 6,250 | 6,700 | 7,175 | 6,250 | | | |
| Modulus at 300% elong., percent | 625 | 1,050 | 1,350 | 2,050 | | | |
| Modulus at 500% elong., percent | 1,850 | 2,400 | 2,200 | 2,675 | | | |
| Elongation at break, percent | 610 | 660 | 690 | 710 | >100 | 80 | |
| Set, percent | 24 | 68 | 140 | >200 | 70 | 40 | |
| Shore A hardness | 69 | 78 | 82 | 93 | >100 | >100 | |

Compression molded 10'/200° C., die cut short Die D tensile specimens—Pulled at 20"/min

| Tensile yield point, p.s.i | | | | | | 3,750 | 4,650 |
|---|---|---|---|---|---|---|---|
| Flexural modulus, p.s.i.×10⁻⁵ | | | | | | 1.7 | 2.4 |
| Notched izod impact strength ft. lbs./in.: | | | | | | | |
| 0° C | | | | | | 0.52 | 0.43 |
| 23° C | | | | | | 1.29 | 0.96 |
| Shore D hardness | | | | | | 69 | 73 |
| Rockwell R hardness | | | | | | 87 | 96 |

ASTM injection molded tensile bars—Pulled at 0.2"/min.

¹ No yield.

Table IIIB

| Block polymer, percent w | 100 | 85 | 75 | 50 |
|---|---|---|---|---|
| Polypropylene, percent w | 0 | 15 | 25 | 50 |
| Tensile yield point, p.s.i | (¹) | (¹) | 500 | 1,275 |
| Tensile strength, p.s.i | 4,550 | 5,700 | 6,500 | 6,325 |
| Modulus at 300% elong., p.s.i | 300 | 1,075 | 1,350 | 1,925 |
| Modulus at 500% elong., p.s.i | 500 | 1,650 | 2,025 | 2,425 |
| Elongation at break, percent | 710 | 710 | 750 | 770 |
| Set, percent | 18 | 60 | 100 | >300 |
| Shore A hardness | 64 | 79 | 84 | 96 |

¹ No yield.

Table IIIC

| Block polymer, percent w | 100 | 85 | 75 | 50 |
|---|---|---|---|---|
| Polypropylene, percent w | 0 | 15 | 25 | 50 |
| Tensile yield point, p.s.i | (¹) | (¹) | 450 | 1,350 |
| Tensile strength, p.s.i | 5,650 | 6,000 | 6,700 | 5,750 |
| Modulus at 300% elong., p.s.i | 400 | 925 | 1,075 | 1,825 |
| Modulus at 500% elong., p.s.i | 600 | 1,400 | 1,700 | 2,225 |
| Elongation at break, percent | 900 | 825 | 850 | 850 |
| Set, percent | 32 | 115 | 175 | >400 |
| Shore A hardness | 71 | 86 | 88 | 96 |

Compression molded 10'/200° C., die cut short Die D tensile specimens—Pulled at 20"/min.

¹ No yield.

EXAMPLE IV

The blends of the block copolymer described in Example I were made with polyethylene having the following properties. The blends were prepared on a rubber mill at 180° C. and molded for 10 minutes at 160° C. The following properties of the various blends prepared were obtained:

Table IV

| Sample | T | U | V | W | X | Y | Z |
|---|---|---|---|---|---|---|---|
| Block Polymer percent w. | 100 | 95 | 90 | 85 | 75 | 50 | 0 |
| Polyethylene | 0 | 5 | 10 | 15 | 25 | 50 | 100 |
| Yield | 200 | 200 | 150 | 200 | 175 | 375 | 950 |
| $T_B$ | 4,150 | 4,400 | 4,600 | 4,475 | 4,225 | 3,300 | 1,325 |
| $M_{300}$ | 400 | 375 | 375 | 450 | 475 | 725 | 1,025 |
| $M_{500}$ | 1,050 | 700 | 700 | 850 | 800 | 1,025 | 1,100 |
| $E_B$ | 645 | 755 | 795 | 740 | 800 | 795 | 600 |
| Set | 18 | 20 | 30 | 40 | 65 | 200 | >500 |
| Shore B | 65 | 66 | 66 | 68 | 70 | 82 | 93 |

We claim as our invention:

1. A polymeric composition comprising:
   (1) a hydrogenated block copolymer having the general configuration A-B-A wherein, prior to hydrogenation,
      (a) the A's are polymer blocks of a mono alkenyl aromatic hydrocarbon, said block having an average molecular weight of 4000 to 115,000, and
      (b) B is a polymer block of a conjugated diene, said block having an average molecular weight of 20,000 to 450,000,
      (c) said copolymer being hydrogenated sufficiently to reduce its unsaturation to less than 30% of its original value; and
   (2) an alpha olefin polymer having a molecular weight of at least 5000 of the group consisting of homopolymers of unbranched alpha-monoolefins of about 2 to 6 carbon atoms and copolymers of these materials with each other.

2. A polymeric composition comprising:
   (1) a hydrogenated block copolymer having the general configuration A-B-A, wherein prior to hydrogenation,
      (a) the A's are polymer blocks of mono-vinyl substituted aromatic hydrocarbons, the average molecular weight of each A being 8000 to 60,000 and
      (b) B is a polymer block of a $C_{4-10}$ conjugated diene, said block having an average molecular weight of 50,000 to 300,000;
      (c) said copolymer being hydrogenated sufficiently to reduce its unsaturation to less than 20% of its original value; and
   (2) an unbranched $C_{2-6}$ alpha-monoolefin homo polymer having an average molecular weight of at least 10,000;
   (3) said composition containing 2,5-97.5 parts by weight of olefin polymers per 100 parts of composition.

3. A polymeric composition according to claim 1 wherein
   (a) the block copolymer prior to hydrogenation has the configuration polystyrene-polyisoprene-polystyrene (b) the alpha-olefin polymer is polypropylene having an average molecular weight in excess of 10,000.

4. A polymeric composition according to claim 1 wherein
   (a) the block copolymer prior to hydrogenation has the configuration polystyrene-polybutadiene-polystyrene and
   (b) the alpha olefin polymer is polypropylene having an average molecular weight in excess of 10,000.

5. A polymeric composition according to claim 2 wherein the alpha-olefin polymer is polyethylene having an average molecular weight in excess of 10,000.

6. A polymeric composition comprising
   (a) a hydrogenated block copolymer having the general configuration prior to hydrogenation polystyrene-polyisoprene-polystyrene wherein the polystyrene blocks have average molecular weights of 10,000 to 25,000, the polyisoprene block has an average molecular weight of 50,000 to 100,000 the original unsaturation of the copolymer being reduced at least 85% by hydrogenation; and
   (b) isotactic polypropylene;
   (c) the composition containing 5–30 parts by weight of copolymer per 100 parts by weight of composition.

7. A polymeric composition comprising
   (a) a hydrogenated block copolymer having the general configuration prior to hydrogenation polystyrene-polyisoprene-polystyrene wherein the polystyrene blocks have average molecular weights of 10,000 to 25,000, the polyisoprene block has an average molecular weight of 50,000 to 100,000, the original unsaturation of the copolymer being reduced at least 80% by hydrogenation; and
   (b) isotactic polypropylene;
   (c) the composition containing 70–95 parts by weight of copolymer per 100 parts by weight of composition.

8. A composition according to claim 1 wherein the alpha olefin polymer is a copolymer of at least two olefins.

References Cited by the Examiner

UNITED STATES PATENTS 2,910,451  10/1959  Cantwell _____ 260—889

FOREIGN PATENTS 856,793  12/1960  Great Britain.
895,980  5/1962  Great Britain.

MURRAY TILLMAN, *Primary Examiner.*

SAMUEL H. BLECH, *Examiner.*

G. F. LESMES, *Assistant Examiner.*